United States Patent [19]

Orchard et al.

[11] Patent Number: 4,621,808
[45] Date of Patent: Nov. 11, 1986

[54] VISCO-ELASTIC WEIGHT

[75] Inventors: Lewis P. Orchard; Judi K. Simon, both of McLennan County, Tex.

[73] Assignee: Kimberly-Clark Corporation, Neenah, Wis.

[21] Appl. No.: 718,924

[22] Filed: Apr. 2, 1985

[51] Int. Cl.[4] .......................................... A63B 21/12
[52] U.S. Cl. ........................................ 272/119; 2/170
[58] Field of Search ...................... 272/119, 122, 123; 524/431; 273/169, 194 B, 29 A; 128/165; 2/181, 170

[56] References Cited

U.S. PATENT DOCUMENTS

| | | | |
|---|---|---|---|
| 2,846,228 | 8/1958 | Reach | 273/169 |
| 3,490,766 | 1/1970 | Gardner | 272/119 |
| 3,521,883 | 7/1970 | Hamilton | 273/72 R |
| 4,005,864 | 2/1977 | Stewart | 273/73 R |
| 4,068,318 | 1/1978 | McMahon | 273/29 A X |
| 4,189,424 | 2/1980 | Takamatsu | 524/431 X |
| 4,220,336 | 9/1980 | Kochevar | 273/169 X |
| 4,351,526 | 9/1982 | Schwartz | 272/122 |

FOREIGN PATENT DOCUMENTS 8301201  4/1983  PCT Int'l Appl. ................ 272/119

Primary Examiner—Richard J. Apley
Assistant Examiner—John L. Welsh
Attorney, Agent, or Firm—Kimberly-Clark Corporation

[57] ABSTRACT

A visco-elastic or soft weight is disclosed, made from a core comprising a particulate weight-adding agent substantially homogeneously dispersed within a visco-elastic material and a cover surrounding the core.

A novel weighted visco-elastic composition comprises a visco-elastic material comprising 77–97% plasticizer, 3–15% resin, 0–2% thixotropic thickening agent, 0–2% stabilizer, 0–2% stabilizer enhancer, and 0–2% surfactant and a particulate weight-adding agent in a ratio of weight-adding agent to visco-elastic material of between 1:10 and 2:1.

5 Claims, 3 Drawing Figures 4,621,808

VISCO-ELASTIC WEIGHT

BACKGROUND OF THE INVENTION

This invention relates to exercise weights, and more particularly to materials used in making soft visco-elastic exercise weights.

For various reasons, it is often desirable to have weight added to the body during physical activity. Such activity may be part of a program of physical rehabilitation for injured persons, or a health maintaining daily exercise program such as jogging or aerobic dancing. During the exercise movement, the added weight increases the work accomplished, increasing caloric consumption and causing more rapid or additional muscle development, and other coordinated health benefits.

In the past, it has been known to attach a variety of weights to the body by various means. The weights have generally been covered with a foam material in an effort to make them more comfortably held against the body. For example, in one well known device, a metal bar about five inches long is covered with foam and is designed to be held by clinching the hand around the bar during exercise. A hand strap, also covered by foam, is attached which fits around the back of the hand to help the exerciser hang onto the device while exercising. Other devices have been designed to fit around the waist, wrist or ankles, generally comprising a flexible pouch, often segmented, containing weights such as lead shot, lead bars, sand or the like. Some of the weights are covered with foam and have an outer vinyl covering. The weights are secured to the body by being wrapped around a narrow portion of the body and fastened in place using buckles or Velcro-type fasteners.

Previously known devices have several disadvantages. Primarily, the devices are hard and cause bruises if they strike the flesh of either the wearer or other persons exercising nearby. Devices attached to a narrow portion of the body rub and chafe the skin where they are attached. The vinyl covering allows the weight to slip as the skin surface gets sweaty. The method of fastening the weights around the body is sometimes difficult, especially for arthritic persons. The fastening device may need to be adjusted if the device is initially too tight or too loose, or gets loose during use.

Another device which has been commercially sold is a hand exerciser consisting of a visco-elastic material in the form of a cylinder, weighted by lead shot placed in a concentric cylindrical cavity inside of the visco-elastic material cylinder. The lead shot serves to weight the hand exerciser like other exercise weights. The visco-elastic material is covered by absorbent cloth, with an elastic strap attached at both ends to help hold the cylinder in the palm of the hand. A disadvantage of this type of device is that the lead shot tends to cut into the visco-elastic material during use, eventually destroying the visco-elastic matrix. In addition, the hollow cylinder design has a fundamental weakness in that the visco-elastic material cross sectional area is reduced by the hollow shot filled area, making the exerciser less durable than a product without such a cavity.

SUMMARY OF THE INVENTION

A visco-elastic weight is provided which includes a core of visco-elastic material containing a substantially homogenously dispersed particulate weight-adding agent, the core being surrounded by a cover. One novel composition that can be used for the weighted visco-elastic material comprises a visco-elastic material comprising 77-97% plasticizer, 3-15% resin, 0-2% thixotropic thickening agent, 0-2% stabilizer, 0-2% stabilizer, 0-2% stabilizer enhancer and 0-2% surfactant, and a particulate weight-adding agent in a ratio of from 1:10 to 2:1 weight adding agent to visco-elastic material. Another aspect of the invention includes the methods of making the novel composition and visco-elastic weight products.

The product of the present invention may be formed into various shapes. The presently preferred embodiment is a generally annular shaped weight made from a core weighing about one pound. The weighted visco-elastic core is covered by a stretchy, absorbent material, such as terry cloth. The weight is stretchy enough so that the hole in the center of the annular core can be expanded to slide over a hand or foot, and is elastic enough so that the weight remains in place on the adjoining wrist or ankle during exercise movements.

One advantage of the visco-elastic weight of the present invention is that it is soft and will not bruise flesh which it might inadvertently strike. The material from which the weight is made is very flexible, and thus reduces the shock caused by sudden changes in speed or direction of the weight during exercise movements. The visco-elastic nature of the weight, combined with the covering, results in a weight which does not chafe the skin. The visco-elastic material used also is durable and may be repeatedly stretched and used without disintegrating. In the preferred embodiment of a wrist weight, the weight is placed easily on the wrist and requires no fastener adjustment.

DETAILED DESCRIPTION OF THE PREFERRED EMBODIMENTS

Figure 1:
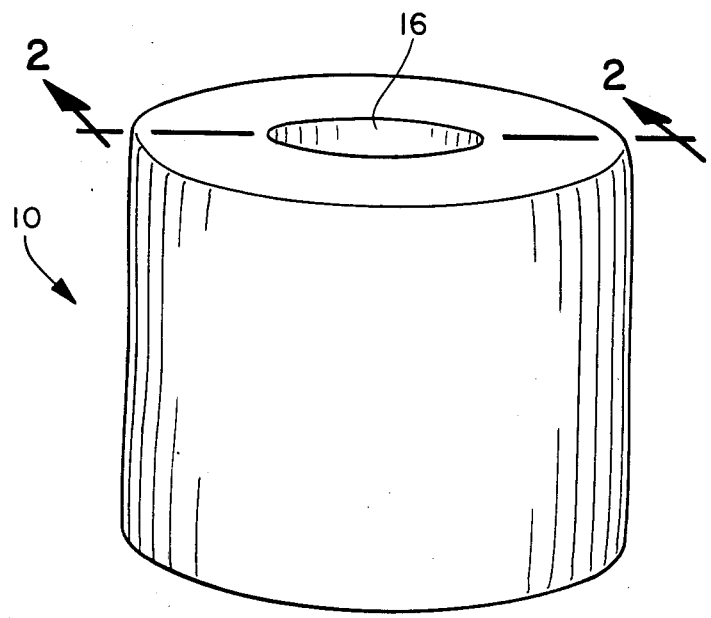
FIG. 1 is a perspective view of a wrist or ankle weight, the preferred product of the present invention.
Figure 2:
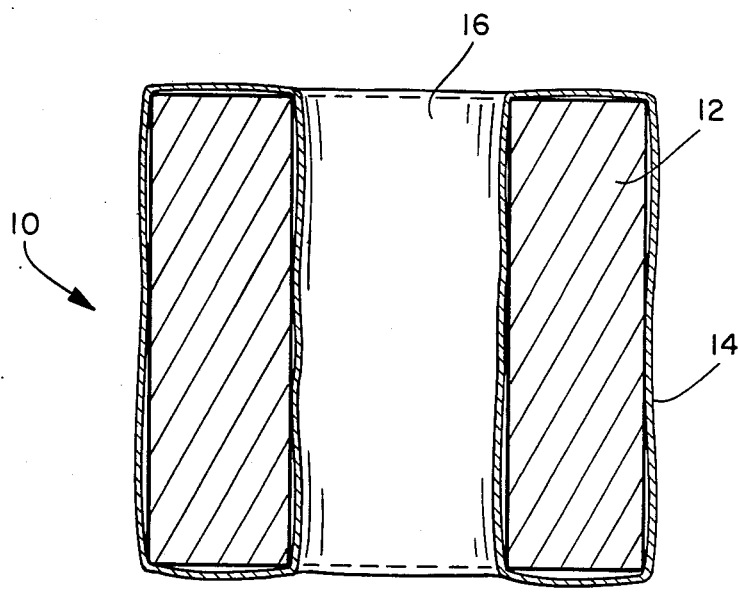
FIG. 2 is a sectional view of the weight of FIG. 1 taken along the axis, line 2—2, of FIG. 1.

The preferred embodiment of the product of the present invention, shown in FIGS. 1 and 2, comprises a wrist or ankle weight 10. The weight has a core 12 of weighted visco-elastic material surrounded by an absorbent covering 14. The core of the weight has an annular shape, about 3 inches tall and about 3¼ inches in diameter, with a hole 16 about 1½ inches in diameter through the center. The core 12 is covered by a knit, absorbent, two way stretch terry cloth material 14. The preferred embodiment is made in a one pound size, though other sizes could be used.

The core 12 is made of a visco-elastic material with a particulate weight-adding agent substantially homogeneously dispersed within the visco-elastic material, otherwise referred to as a weighted visco-elastic material. In the preferred embodiment, the core 12 has a specified gravity of approximately 2.5.

The weighted visco-elastic material and cover are stretchy enough so that the 1½ inch diameter hole can expand to fit over a hand or foot. The elasticity of the material causes the hole to contract gently around the wrist or ankle once the weight is in place. The weight stays in place during exercise movements.

Figure 3:
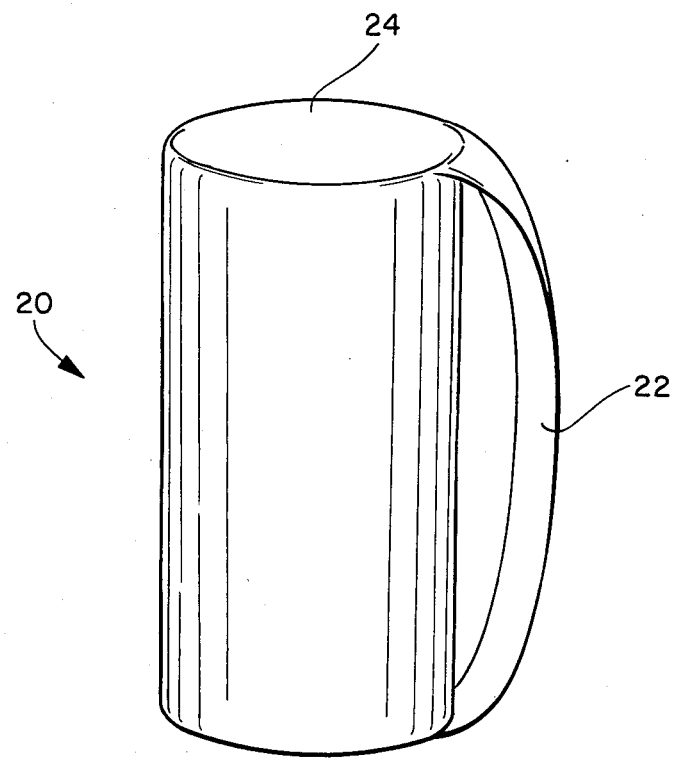
FIG. 3 is a perspective view of a hand-held weight, another embodiment of the present invention.

Another preferred product of the invention, shown in FIG. 3, comprises a weight 20 in the shape of a cylinder. The weight has an elastic strap 22 connected at both ends of the cylindrical cover 24 which fits around the back of the hand as the weight is held in a clinched hand. Other weight shapes can also be made, such as a belt shaped weight carried on the waist.

The term visco-elastic refers to materials such as those described in the U.S. patent application of Wayman R. Spence et al., Ser. No. 676,090, filed Nov. 29, 1984, commonly assigned to the assignee of the present application. In general, the term visco-elastic refers to soft, incompressible elastic materials which are able to deform under slight pressure and resume their original shape when the pressure is removed. In particular, the preferred visco-elastic material described herein can be characterized as either a highly plasticized resin or a plasticizing material thickened with a minor portion of resin. Other less preferred visco-elastic materials include silicones and urethanes.

The following is a detailed description of the components used in making the preferred weighted visco-elastic material:

A. Plasticizer

The plasticizer used in the preferred embodiment is dialkyl phthalate, available as Monsanto Santicizer 711 purchased from Chemcentral Co., Dallas, Tex. Other plasticizers that may be used include diundecyl phthalate (DUP), dioctyl phthalate (DOP) and duisononyl phthalate (DINP).

B. Resin

The resin used in the preferred embodiment is a white, powdered polyvinylchloride resin, PVC 6422 from Occidental Chemical Co., Pottstown, PA. Other PVC resins that may be used include Bordon's PVC resin 1069. The resin and plasticizers used must be compatible.

C. Thixotropic Thickening Agent

The preferred thixotropic thickening agent is silicone dioxide ($SiO_2$), also known as fumed silica, available from Cabot Corporation, Tuscola, IL., as Cab-O-Sil M5. Other thixotropic thickening agents that can be used, though not as well as the preferred embodiment, include clay materials with quaternary ammonia or organic thixotropic agents, such as castor oil derivatives or ethylene complexes.

D. Stabilizer

The preferred stabilizer is barium zinc phenate, available as Synpron 940 from Snythetic Products, Cleveland, Ohio. Other stabilizers that may be used include calcium zinc and zinc tin stabilizers. The stabilizer allows the resin and plasticizer composition to be processed at elevated temperatures without degredation.

E. Stabilizer Enhancer

The preferred stabilizer enhancer is epoxidized soy-oil, available as Interstab Plastoflex 2307 from John Watson Company, Dallas, Tex. Other epoxidized soy-oil products that are effective stabilizer enhancers include Peraplex G-62 from Rohm & Hass. The stabilizer enhancer is used to increase the effectiveness of the stabilizer. Additional stabilizer can be used instead of the stabilizer enhancer.

F. Surfactant

The preferred surfactant is Kelecin F, available from Spencer Kellogg Division of Textron Incorporated, Buffalo, N.Y. Other surfactants that can be used including Surfysol 104A.

G. Weight-adding Agent

The preferred particulate weight adding agent is barium sulfate, $BaSO_4$, from Macobar Corp. and obtained through Lattnor-Novak Mud Services, Grosbeck, Tex. The preferred embodiment is ground to a powder such that substantially all, about 97%, passes through a 200 mesh screen. Other weight adding agents that may be used, though less preferred, include lead oxide (PbO), iron oxide ($Fe_2O_3$) and other minerals with a specific gravity of about 4 or more. Barium sulfate is preferred because it is inexpensive and is less abrasive on processing equipment than metal oxides.

The novel weighted visco-elastic material used in the invention comprises 77–97% plasticizer and 3–15% resin, with optional use of up to 2% thixotropic thickening agent, up to 2% stabilizer, up to 2% stabilizer enhancer and up to 2% surfactant. All of the foregoing are used to make a visco-elastic material to which is added a particulate weight-adding agent, in a ratio of from 1:10 to 2:1 weight-adding agent to visco-elastic material, to make the novel weighted visco-elastic material.

A more preferred range of materials in the weighted visco-elastic material is as follows: a visco-elastic material comprising:

| | |
|---|---|
| 80–96% | plasticizer |
| 4–15% | resin |
| 0–2% | thixotropic thickening agent |
| 0–1% | stabilizer |
| 0–1% | stabilizer enhancer |
| 0–1% | surfactant | and a particulate weight-adding agent substantially homogeneously mixed with the visco-elastic material in a ratio of between 6:10 and 17:10 weight-adding agent to visco-elastic material.

A most preferred range of materials used in making the weighted visco-elastic material is a visco-elastic material comprising:

| | |
|---|---|
| 87–93% | plasticizer |
| 7–10% | resin |
| 0.5–1.5% | thixotropic thickening agent |
| 0–0.3% | stabilizer |
| 0–0.3% | stabilizer enhancing |
| 0.1–0.5% | surfactant | and a particulate weight-adding agent substantially homogeneously dispersed within the visco-elastic material in a ratio of between 8:10 and 12:0 weight-adding agent to visco-elastic material.

The method for producing the weighted visco-elastic material includes the steps of: mixing 77 to 97 parts by weight plasticizer with 3 to 15 parts by weight resin to form a plasticizer-resin mixture, substantially homogeneously mixing from 1 to 20 parts by weight of a particulate weight-adding agent to one part by weight plasticizer-resin mixture, heating the plasticizer-resin mixture to a fusion temperature before or after adding the weight-adding agent and cooling the resulting weighted plasticizer-resin mixture to form a weighted visco-elastic material.

The fusion temperature is the temperature at which the resin and the plasticizer form a homogeneous system.

In a preferred process embodiment, an initial minor amount of plasticizer (normally in liquid form) is placed in a mixing vessel along with any stabilizers and enhancers which are to be employed therewith. The total amount of resin material to be employed in the batch then is added to the plasticizer/stabilizer mix, initially in an amount of about three parts by weight resin per part by weight plasticizer/stabilizer mixture. The resin, present in a white powder form, is thoroughly wetted by this liquid mixture. Next the mixture is stirred and heated to approximately 170° F. During the heating step additional plasticizer is added until there is approximately 1½ times as much plasticizer as resin in the resin concentrate.

This temperature increase is preferable because the resin expands with heating and is thus better able to stay in suspension in the resin concentrate. A temperature of 170° F. is preferable in that after being heated to 170° F., the resin does not precipitate out of suspension, even after the concentrate formed is cooled, yet 170° F. is below the temperature at which the preferred resin-plasticizer system forms a gel. The temperature could be raised by conventional means, though the preferred method is to heat by the friction generated during the stirring. The friction-stirring heating helps to assure that the material is heated uniformly, and prevents over heated resin from gelling.

Air which has become incorporated during mixing is next removed, such as by drawing the concentrate into a vacuum tank. The deaerated resin concentrate then is added to the major portion of plasticizer to be employed in the batch. Preferably the additional plasticizer is placed in an mixing container and the resin concentrate is added thereto with mixing. The preferred ratio of plasticizer to resin concentrate is about 4:1 by weight.

The resulting plasticizer-resin mixture is next combined with a weight-adding agent in a ratio of weight-adding agent to plasticizer-resin mixture of about 1:10 to 2:1. The material is heated to a fusion temperature yielding the maximum strength in the final product, which is between 325° and 375° F. in the preferred phthalate-PVC resin system. Heating is carried out either before or after the weight-adding agent is added. The heated material is allowed to cool, either in molds of appropriate shape or in larger forms from which appropriate shapes are later cut.

The following examples are provided, not to limit the invention, but rather to further aid one skilled in the art in understanding the process and the preferred method by which the weighted visco-elastic material of the present invention can be prepared.

EXAMPLE 1

In a preferred embodiment of the process, approximately 275 pounds of the dialkyl phthalate plasticizer (Monsanto Stanticizer 711) are delivered to a 300 gallon mixing tank. To the plasticizer is added 33 pounds of epoxidized soybean-oil (Interstab Plastoflex 2307) and about 33 pounds of Ba Zn phenate (Synpron 940). To this mixture is added thirteen 50 pound bags (a total of 650 pounds) of polyvinylchloride resin (Occidental Chemical PVC 6422).

The 300 gallon mixing tank is fitted with a mixer and blade, and the blade is set to its lowest position, about 8 inches off the bottom of the tank, and is operated initially at a low speed. When all of the resin has been pulled beneath the surface of the plasticizer the mixer blade is raised to a position about 12 inches above the bottom of the tank and mixing is continued until all of the resin is wetted and the mixture is homogeneous. The mixer blade speed is then increased to approximately 1200 rpm. At this initial point in the mixing process the mixing motor ammeter reads approximately 20-24 amps. As the mixture heats up, the viscosity of the mixture decreases and the amperage of the mixer motor drops. The temperature of the mixer is monitored carefully. At approximately 135° F. the viscosity starts to increase. Additional dialkyl phthalate is added to the mixture to keep the viscosity low and maintain the mixer motor amperage at a load of about 20 amps. The dialkyl phthalate is added intermittently until the temperature of the mixture reaches 170°-175° F., while the mixer is pulling about 20 amps. Throughout this mixing process the insides of the mixing tank are continuously scraped clean of resin with a long handed spatula. At no point in the process is the temperature of the mixture permitted to exceed 175° F. to avoid gelling the mixture. A total of 975 pounds (approximately 125 gallons) of dialkyl phthalate is added during the process. The resulting resin concentrate is a thin liquid which is pulled from the mixing tank through a screen and into a 450 gallon vacuum tank containing a ribbon blender.

Next approximately 1,024 pounds of dialkyl phthalate (again, Monsanto Stanticizer 711) is pumped into a large, open vat. The material has a specific gravity of about 0.97 at 25° C. To the plasticizer material is added 256 pounds of the resin concentrate formed as described above. The concentrate and plasticizer are mixed thoroughly with the mixing blade attached to an electric mixer. This plasticizer-resin mixture is then transferred to a holding vat which is continually stirred and heated to a constant temperature of approximately 115° F. The mixture is then run through an extruder. The extruder has electric heater bands that are controlled thermostatically to heat the incoming liquid to an exit temperature of approximately 350° F. The hot diluted concentrate is weighed and an equal amount of barium sulfate is added. The barium sulfate is stirred into the mixture using an electric mixer. The mixture is poured into annular shaped molds and cooled.

EXAMPLE 2

A more preferred method of making the weighted visco-elastic material is as follows. A plasticizer-resin mixture is prepared as in Example 1, up to and including the step of dilution in the open vat. About 500 pounds of the mixture is transferred to a mixing tank. Using an approximately five-inch blade rotating at approximately 2000 RPM, about 10 pounds of fumed silica (Cab-O-Sil M5) are stirred into the plasticizer-resin mixture. The fumed silica acts as a thixotropic thickening agent to form a thixotrope. Additionally, about 1 pound of Kelecin F is stirred in as a surfactant. The resulting thixotrope is stirred for about about 5-10 minutes.

Next about 500 pounds of barium sulfate powder (Macobar Corp.) is stirred into the thixotrope formed above, using the same equipment and mixer speed, and mixed for about 10 minutes. The resulting weighted thixotrope is pumped to a vacuum vessel where air is removed. Using this deaeration step, the deaeration step of Example 1 is unnecessary. The deaerated material is then heated to 350° F. in an extruder and placed into molds to form cores for visco-elastic weights. After cooling, the cores are removed from the mold and treated in a degreasing apparatus where plasticizer in the outer layer of the core is dissolved and removed by trichlorotrifluoroethane. Finally the degreased cores are covered with a terry cloth knit material.

The thixotropic thickening agent and surfactant can be added in any order, and could even be added at the time the resin concentrate is formed. The purpose of the thixotropic thickening agent is to keep the weight-adding agent uniformly suspended after it is added and until the visco-elastic material sets up. The surfactant aids in mixing the weight-adding agent into the plasticizer-resin mixture. The degreasing step is not essential and is used only to leave the cores with a less greasy feeling surface, making it easier to cover them with the knit material.

The deaeration step has two purposes. First, if heating is performed in a closed device, such as an extruder, it is important to remove air so that the pressure inside the device does not substantially increase as the temperature increases. Second, the final product is stronger and denser with less entrapped air. Thus it is preferable to remove the air as in Example 2 after all of the mixing is completed.

The temperature to which the weighted mixture is heated affects the strength of the resulting product. The higher the temperature to which the mixture is heated, the higher the fusion temperature of the resin, and the stronger the resulting product. Other plasticizer-resin systems could be heated to 350° F. in an extruder without the need of a stabilizer, making the stabilizer and stabilizer enhancer unnecessary with those systems at 350° F. However, higher processing temperatures may be desirable to increase the strength of products made from such other systems, and stabilizer would thus be useful in such embodiments of the invention.

Various other alternatives to this preferred procedure may also be used in making the composition and product of the present invention. For example, heating the weighted thixotrope can be accomplished by other procedure, such as by using a stirred heating vessel, which uniformly heats the thixotrope. Uniform heating is required to prevent part of the mixture from getting too hot and decomposing without sufficient heating of other parts of the mixture.

The novel product and composition of the present invention has numerous advantages in addition to those previously described. The weights can be warmed before use in cold weather, or cooled before use in warm weather. The novel composition will not go brittle when cooled, even down to 0° F. and beyond. The annular shaped devices may be secured on the wrists or ankles without the need for Velcro-type or other fasteners, making the device simple to put on and leaving the hands free during exercise maneuvers. The absorbent covering of the preferred embodiment can be used as a sweat band.

The product of the present invention is advantageous over the lead shot containing hand exerciser because the weight-adding agent is in particulate form and does not cut into the visco-elastic matrix during use. Also, by incorporating the weight-adding agent in particulate form, higher loading is possible making a denser product, and the resulting weighted visco-elastic core is stronger than a core containing a cavity. It has also been discovered that the use of barium sulfate increases the strength of the resulting weighted visco-elastic material over that of unweighted visco-elastic material of an otherwise similar composition.

While the invention has been described above with respect to its preferred embodiments, it will be understood that the invention is capable of numerous rearrangements, modifications and alterations and all such arrangements, modifications and alterations are intended to be within the scope of the appended claims.

We claim:
1. A visco-elastic weight comprising:
   (a) a core of weighted visco-elastic material comprising:
      (i) a particulate weight-adding agent substantially homogeneously dispersed within a visco-elastic material; and
   (b) a covering surrounding the core wherein said core has a generally annular shape and the weighted visco-elastic material and covering are capable of elastic stretching to the extent necessary for the weight to slip over a hand or foot and remain in place on an adjoining wrist or ankle during exercise movement.
2. The visco-elastic weight of claim 1 wherein
   (a) the weighted visco-elastic material comprises:
      (i) 77–97 percent plasticizer,
      (ii) 3–15 percent resin,
      (iii) 0–2 percent thixotropic thickening agent,
      (iv) 0–2 percent stabilizer,
      (v) 0–2 percent stabilizer enhancer and
      (vi) 0–2 percent surfactant; and
   (b) the particulate weight-adding agent is present in a ratio of weight-adding agent to visco-elastic material of from 1:10 to 2:1.
3. The weight of claim 1 wherein the core weighs about one pound.
4. The weight of claim 1 wherein the cover comprises an absorbent material.
5. The weight of claim 4 wherein the cover comprises a knit fabric.

* * * * *